United States Patent Office 3,092,675
Patented June 4, 1963

3,092,675
ISOOLEFIN-MULTIOLEFIN COPOLYMER OILS
Augustus B. Small, Westfield, N.J., assignor to Esso Research and Engineering Company, a corporation of Delaware
No Drawing. Filed May 26, 1959, Ser. No. 815,802
3 Claims. (Cl. 260—683.15)

This invention relates to the production of new and useful gel-free isoolefin-multiolefin copolymer oils having mole percent unsaturations of about 3 to 50 and viscosities of about 0.1 to 1,000 poises. There has been considerable interest in the fields of synthetic high unsaturation rubbers such as GR-S rubber (butadiene-styrene rubber) for the production of such synthetic oils useful as rubber plasticizers. Also, in the field of lubricating oils, such synthetic oils have been desired as intermediates in the production of lubricating oil additives.

Heretofore, it has been considered to be impossible to produce such copolymer oils with sufficiently high unsaturation but without the simultaneous production of undesirable gel.

In accordance with the present invention, gel-free copolymer oils are produced at about 5° C. to about 150° C., preferably at about 10° to 100° C., by copolymerizing, for about 1 to 100, preferably for about 2 to about 60 minutes, about 5 to 95 weight percent, advantageously about 8 to 92 weight percent, and preferably about 10 to 90 weight percent each of a $C_4$ to $C_8$ isoolefin such as 2-methyl-1-butene, 3-ethyl-1-butene or especially isobutylene and a $C_4$ to $C_{14}$ multiolefin such as myrcene, dimethallyl, allo-ocimene or preferably a $C_4$ to $C_6$ or $C_8$ conjugated diolefin such as butadiene, dimethyl butadiene, piperylene or especially isoprene. The copolymerization is desirably conducted to 100 percent conversion and in the presence of about 10 to 500, advantageously about 15 to 150 and preferably about 20 to 100 volumes, per volume of reacting comonomers, of an admixture of about 0.05 or 0.1 to 20 or 30, preferably about 0.5 or 1.0 to 4 or 5 weight percent of an uncomplexed aluminum bromide or especially an uncomplexed aluminum chloride catalyst ($BF_3$, $BCl_3$ and $TiCl_4$ being inoperative) dispersed in an inert diluent such as a $C_3$ to $C_{10}$ inert hydrocarbon or halogenated derivatives of such hydrocarbons, examples of which are hexane, heptane, naphtha, mineral spirits, chloroform, trichloroethane, carbon tetrachloride, etc. The resulting copolymer oils produced have viscosities in poises at 75° F. to about 0.1 to 1,000, advantageously about 0.3 to 500 and preferably about 0.5 to 300; the mole percent unsaturation of such oils being about 3 to 50, advantageously about 5 to 35 and preferably about 10 to 25. It is, of course, also possible to fractionate such copolymer oils into 2 or more oils, depending upon the desired use.

In order to more fully illustrate but not to limit the present invention, the following experimental data are given wherein 1 volume of various ratios of isobutylene and isoprene were copolymerized in the presence of 40 volumes of various amounts of $AlCl_3$ dispersed in various quantities of hexane; the copolymer oils obtained being fractionated into two different oily copolymers by distillation under 100 mm. pressure absolute and at 200° C. to produce 86.8 to 99.7 weight percent of "heavy copolymer oil," the balance being a "light copolymer oil." The reaction conditions and products formed were as follows:

| Feed | | Catalyst | | Reactor Average Temp., °C. | Light Polymer Oil, Wt. Percent | Heavy Polymer Oil, Wt. Percent | Inspection of Heavy Polymer | |
|---|---|---|---|---|---|---|---|---|
| Isobutylene, Wt. Percent | Isoprene, Wt. Percent | Hexane, cc. | $AlCl_3$, grams | | | | Viscosity, poise at 75° F. | Mole Percent Unsaturation |
| 91 | 9 | 1,000 | 7 | 56 | 13.2 | 86.8 | 0.5 | 21.3 |
| 80 | 20 | 1,000 | 7 | 54 | 1.4 | 98.6 | 3.2 | 15.4 |
| 80 | 20 | 1,000 | 10 | 21 | 6.3 | 93.7 | 75.0 | 10.9 |
| 80 | 20 | 4,000 | 80 | 47 | 1.7 | 98.3 | 10.7 | 15.2 |
| 75 | 25 | 4,000 | 80 | 55 | 2.1 | 97.9 | 9.8 | 16.3 |
| 75 | 25 | 4,000 | 80 | 60 | 3.4 | 96.6 | 7.5 | 17.6 |
| 75 | 25 | 4,000 | 80 | 44 | 0.3 | 99.7 | 34.0 | 13.8 |
| 60 | 40 | 1,000 | 10 | 55 | 1.3 | 98.7 | 220.0 | 15.3 |

The above data show that isobutylene-isoprene copolymer oils are produced in accordance with the present invention having 0.5 to 220.0 poises viscosity at 75° F. and 10.9 to 21.3 mole percent unsaturations.

Resort may be had to modifications and variations of the disclosed embodiments without departing from the spirit of the invention or the scope of the appended claims.

What is claimed is:

1. A process for producing a gel-free isobutylene-isoprene copolymer oil which comprises copolymerizing about 5 to 95 wt. percent each of isobutylene and isoprene in about 10 to 500 volumes per volume of reacting comonomers of an admixture of a major proportion of an inert reaction diluent and, as a polymerization catalyst, 0.05 to 30 wt. percent based on said diluent of an uncomplexed aluminum chloride, at a copolymerization temperature of about 5° C. to about 150° C. for about 1 to about 100 minutes.

2. A process according to claim 1 in which the copolymerization is carried out in about 20 to 100 volumes per volume of reacting comonomers of an admixture of an inert diluent selected from the class consisting of saturated hydrocarbons and chlorinated derivatives thereof and about 0.5 to 30 weight percent of aluminum chloride.

3. A process for producing a gel-free copolymer oil of isobutylene and isoprene which comprises copolymerizing about 60 to 95 weight percent isobutylene with about 40 to 5 weight percent isoprene in about 20 to 100 volumes per volume of reacting comonomers of an inert diluent containing dispersed therein about 1 to 5 weight percent of uncomplexed aluminum chloride based on said diluent at a temperature of about 20 to 70° C. for about 2 to 60 minutes.

References Cited in the file of this patent

UNITED STATES PATENTS

| 2,431,461 | Calfee et al. | Nov. 25, 1947 |
| 2,553,651 | Gessler | May 22, 1951 |
| 2,569,383 | Leyonmark et al. | Sept. 25, 1951 |
| 2,582,411 | Bloch et al. | Jan. 15, 1952 |
| 2,657,246 | Schneider et al. | Oct. 27, 1953 |
| 2,773,051 | Leary | Dec. 4, 1956 |
| 2,780,664 | Serniuk | Feb. 5, 1957 |
| 2,813,136 | Mertz | Nov. 12, 1957 |
| 2,818,460 | Geiser | Dec. 31, 1957 |

OTHER REFERENCES

Thomas et al.: Jour. of Amer. Chem. Soc., 1932, vol. 54, pages 2480–2484.